United States Patent
Basile et al.

(10) Patent No.: US 10,907,602 B1
(45) Date of Patent: Feb. 2, 2021

(54) SYSTEMS AND METHODS FOR A BIDIRECTIONAL DECOUPLER FOR AN INTEGRATED STARTER/GENERATOR

(71) Applicant: Ford Global Technologies, LLC, Dearborn, MI (US)

(72) Inventors: James M. Basile, Dundee, MI (US); Scott Willis, Gibraltar, MI (US); Kwan Jamal Barber, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/586,750

(22) Filed: Sep. 27, 2019

(51) Int. Cl.
*F02N 11/00* (2006.01)
*F02B 67/06* (2006.01)
*F02N 11/04* (2006.01)
*F02N 15/02* (2006.01)

(52) U.S. Cl.
CPC ............ *F02N 11/003* (2013.01); *F02B 67/06* (2013.01); *F02N 11/04* (2013.01); *F02B 2275/06* (2013.01); *F02N 15/023* (2013.01)

(58) Field of Classification Search
CPC ..... F16D 3/12; F16D 3/14; F16D 3/10; F16D 7/025; F02B 67/06; F02B 2275/06; F02N 11/003; F02N 11/04; F02N 15/023; F02N 15/022
See application file for complete search history.

(56) References Cited

U.S. PATENT DOCUMENTS

| 4,871,296 | A | 10/1989 | Laessle et al. | |
|---|---|---|---|---|
| 4,938,732 | A * | 7/1990 | Krude | F16H 9/10 474/53 |
| 6,059,085 | A | 5/2000 | Farnsworth | |
| 6,768,215 | B2 | 7/2004 | Souki et al. | |
| 8,105,018 | B2 | 1/2012 | Gockel et al. | |
| 9,982,721 | B2 | 5/2018 | Antchak et al. | |
| 2001/0008055 | A1* | 7/2001 | Sueshige | F16D 3/12 37/249 |
| 2005/0148417 | A1* | 7/2005 | Garabello | F02B 63/06 474/70 |
| 2009/0215562 | A1* | 8/2009 | Lang | F16H 7/14 474/111 |
| 2015/0024885 | A1* | 1/2015 | Odenmarck | F16H 7/02 474/94 |

FOREIGN PATENT DOCUMENTS

WO 2007116220 A1 10/2007

* cited by examiner

*Primary Examiner* — George C Jin
(74) *Attorney, Agent, or Firm* — Geoffrey Brumbaugh McCoy Russell LLP

(57) ABSTRACT

Methods and systems are provided for a starter/generator in a vehicle drivetrain. In one example, a system may include an integrated starter/generator (ISG) rotationally coupled to an engine crankshaft via a belt drive system, the belt drive system including a first decoupler configured to engage a shaft of the ISG in a first torque transfer direction only and a second decoupler configured to engage the shaft of the ISG in a second torque transfer direction only, the second torque transfer direction opposite the first torque transfer direction. In this way, hubloads that occur while transitioning the ISG between driving the belt drive system and being driven by the belt drive system may be reduced while a response time of the transitioning may also be reduced.

20 Claims, 6 Drawing Sheets

SYSTEMS AND METHODS FOR A BIDIRECTIONAL DECOUPLER FOR AN INTEGRATED STARTER/GENERATOR

FIELD

The present description relates generally to methods and systems for controlling an integrated starter/generator in a vehicle powertrain.

BACKGROUND/SUMMARY

A vehicle may include start-stop technology, wherein an engine of the vehicle is shut down while the vehicle remains on. For example, the engine may be shut down during engine idling, thereby reducing vehicle emissions and increasing fuel economy. Such vehicles may utilize devices such as integrated starter/generators (ISGs). In some examples, the ISG may transmit torque to a crankshaft of the engine to start the engine via a belt and pulley system coupled to a front of the engine. This same belt and pulley system may be used to transmit torque back to the ISG during a regenerative mode of operation to recharge a system battery. Thus, the belt and pulley system must be designed to transmit torque in two different directions: torque from the ISG to the engine during engine starting, and torque from the engine to the ISG during regenerating.

Current ISG belt and pulley systems may include a single belt drive with tensioners to maintain tension in the system when the ISG is transmitting torque to the engine or receiving torque from the engine. This creates inherent difficulties in transitioning the ISG from driving the belt and pulley system during engine cranking to being driven by the system once the engine is running for charging the system battery. During the transitioning, the ISG reduces speed when it is no longer operated to crank the engine. At the same time, the engine crankshaft accelerates, causing a quick change in a rotational phase between the ISG and the crankshaft. This phase change results in a rotational velocity difference at the belt and pulley system that equalizes by abruptly increasing the ISG rotational velocity via belt take up. The resultant large rotational acceleration of the ISG causes high belt tension throughout the belt and pulley system that produces high hubloads at all of the pulleys in the system, which may degrade system components.

Other attempts to provide belt and pulley systems that reduce degradation when transitioning a belt-driven electric motor between transmitting and receiving torque include a transmission system between the electric motor and the engine. One example approach is shown by Barker et al. in WO 2007/116220 A1. Therein, a transmission is installed between an engine crankshaft and a belt alternator/starter (BAS) system. When the engine is running, torque is transferred from the crankshaft of the engine to the BAS at a one to one ratio via the transmission. Conversely, when an engine restart is desired, the torque produced by the BAS is transferred through the transmission at a three to one ratio to the crankshaft of the engine. This reduces an amount of torque carried by the belt to reduce component degradation.

However, the inventors herein have recognized potential issues with such systems. As one example, the transmission of Barker includes two planetary gear trains, which increases vehicle costs and complexity. Further, the transmission may produce operating noise that is unacceptable to a vehicle occupant. Further, the transmission may become degraded over time, increasing vehicle repair costs.

In one example, the issues described above may be addressed by a system, comprising: an integrated starter/generator (ISG) rotationally coupled to an engine crankshaft via a belt drive system, the belt drive system including a first decoupler configured to engage a shaft of the ISG in a first torque transfer direction and disengage in a second, opposite torque transfer direction and a second decoupler configured to engage the shaft of the ISG in the second torque transfer direction and disengage in the first torque transfer direction. In this way, hubloads produced while transitioning the ISG between driving the belt drive system and being driven by the belt drive system may be reduced without a complex transmission.

As one example, the first decoupler may include a first clutch spring and a first pulley that engages with a first belt to rotationally couple the first pulley to the engine crankshaft, and the second decoupler may include a second clutch spring and a second pulley that engages with a second belt to rotationally couple the second pulley to the engine crankshaft. Thus, the belt drive system may include two isolated belt drives, the first belt drive including the first decoupler and the first belt and the second belt drive including the second decoupler and the second belt. Each belt drive may transfer torque in only one direction via engagement or disengagement of the corresponding clutch spring. For example, the first clutch spring may operatively couple the first pulley to the ISG shaft, and therefore the ISG shaft to the crankshaft, only in the first torque transfer direction, and the second clutch spring may operatively couple the second pulley to the ISG shaft, and therefore the ISG shaft to the crankshaft, only in the second torque transfer direction. As an example, the first torque transfer direction may include the ISG applying torque on the engine, such as when the ISG is operated as a motor. Conversely, the second torque transfer direction may include the engine applying torque on the ISG shaft, such as when the ISG is operated as a generator. Further, a first tensioner may maintain tension in a "slack" belt span of the first belt regardless of the torque transfer direction, and a second tensioner may maintain tension in a "slack" belt span of the second belt regardless of the torque transfer direction. By holding tension in each belt drive, the ISG is poised to instantaneously transfer torque in either direction via the separate belt drives, and hubloads produced while switching between the two torque transfer directions are reduced. In this way, the ISG may quickly transition between operating as a motor and operating as a generator without degrading belt drive system components due to high hubloads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
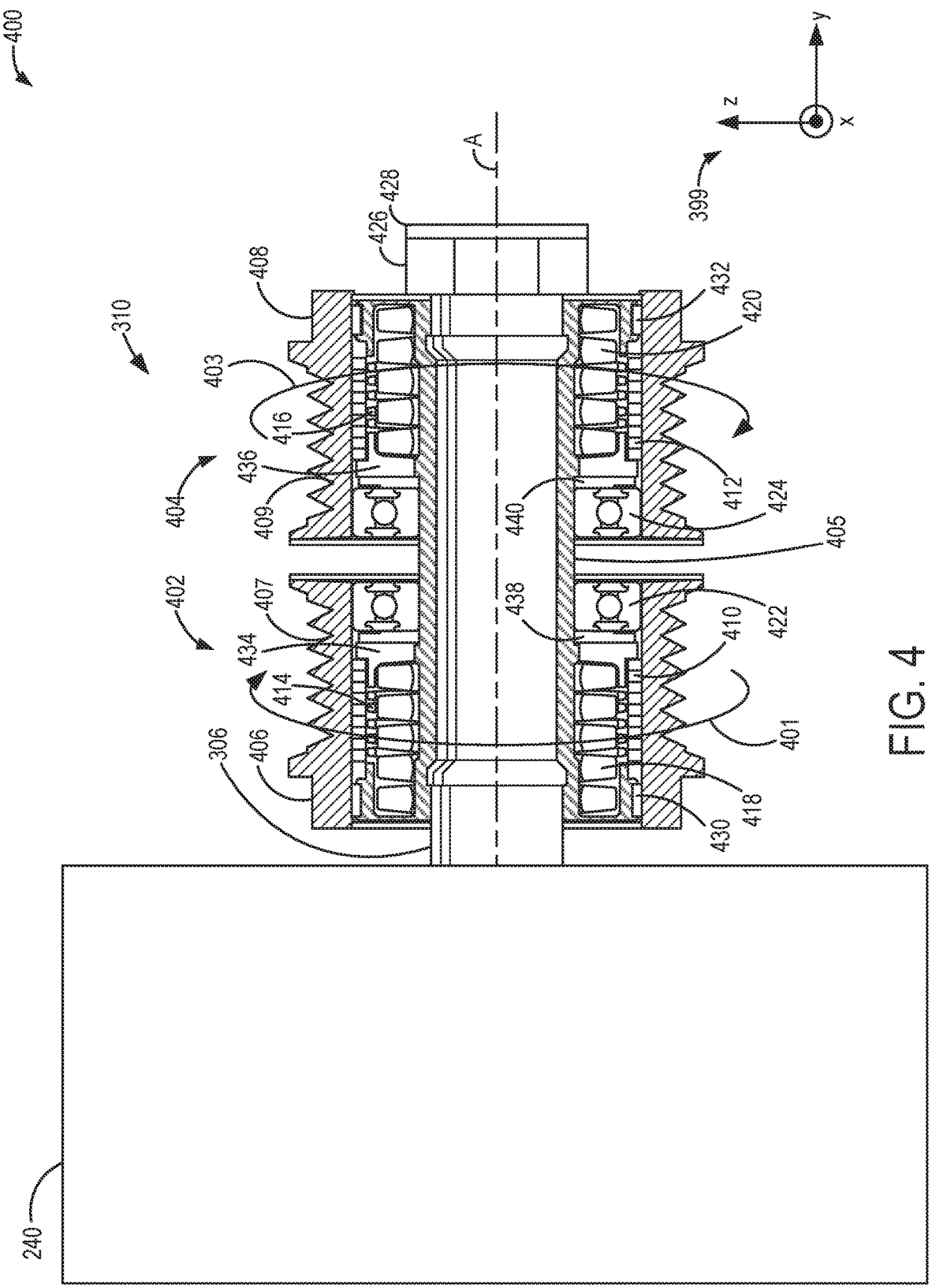
FIG. 4 shows a sectional view of a bidirectional decoupler positioned on a shaft of a belt-driven integrated starter/generator.
Figure 5:
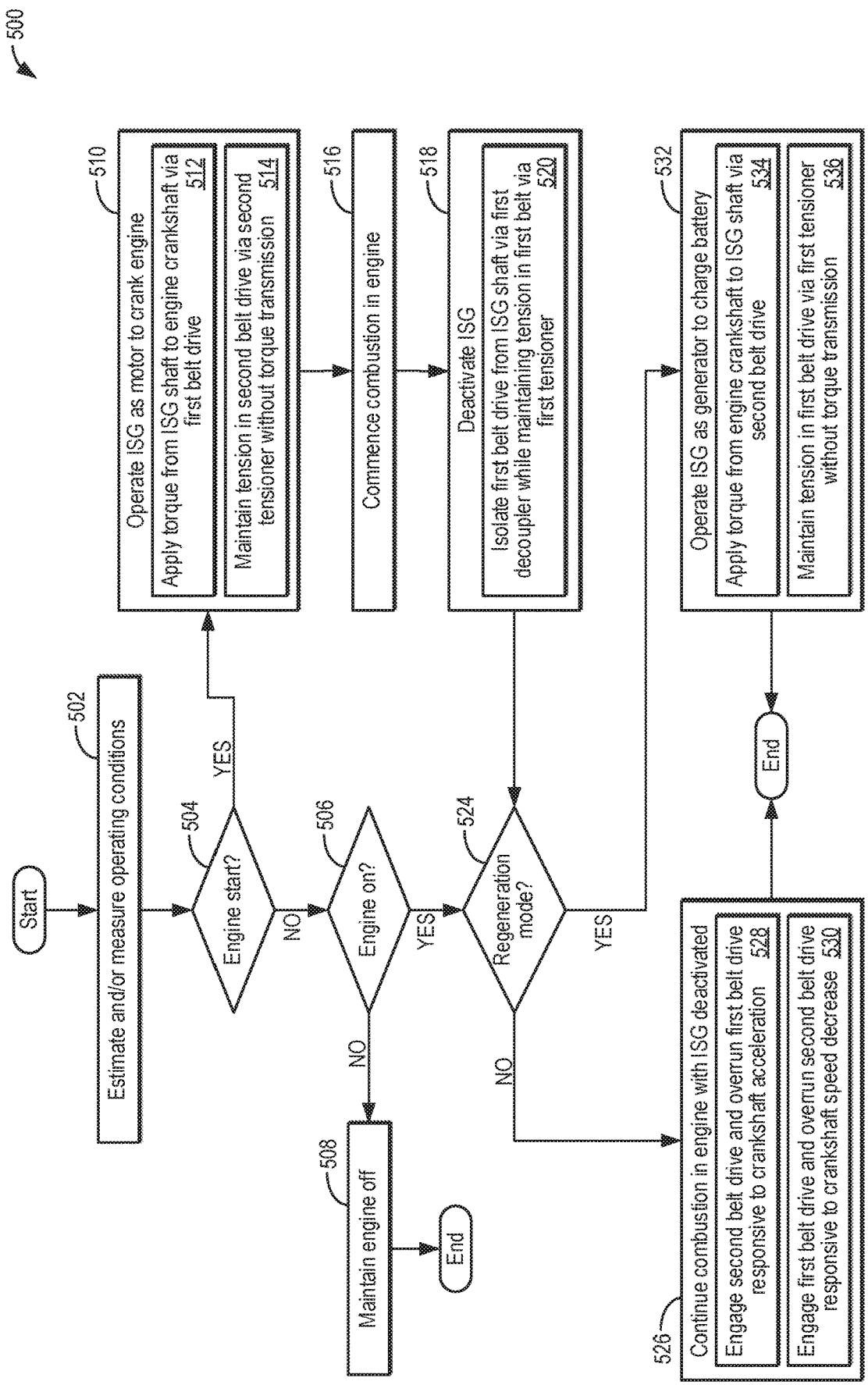
FIG. 5 is a flow chart of an example method for adjusting operation of a belt-driven integrated starter/generator having a bidirectional decoupler.
Figure 6:
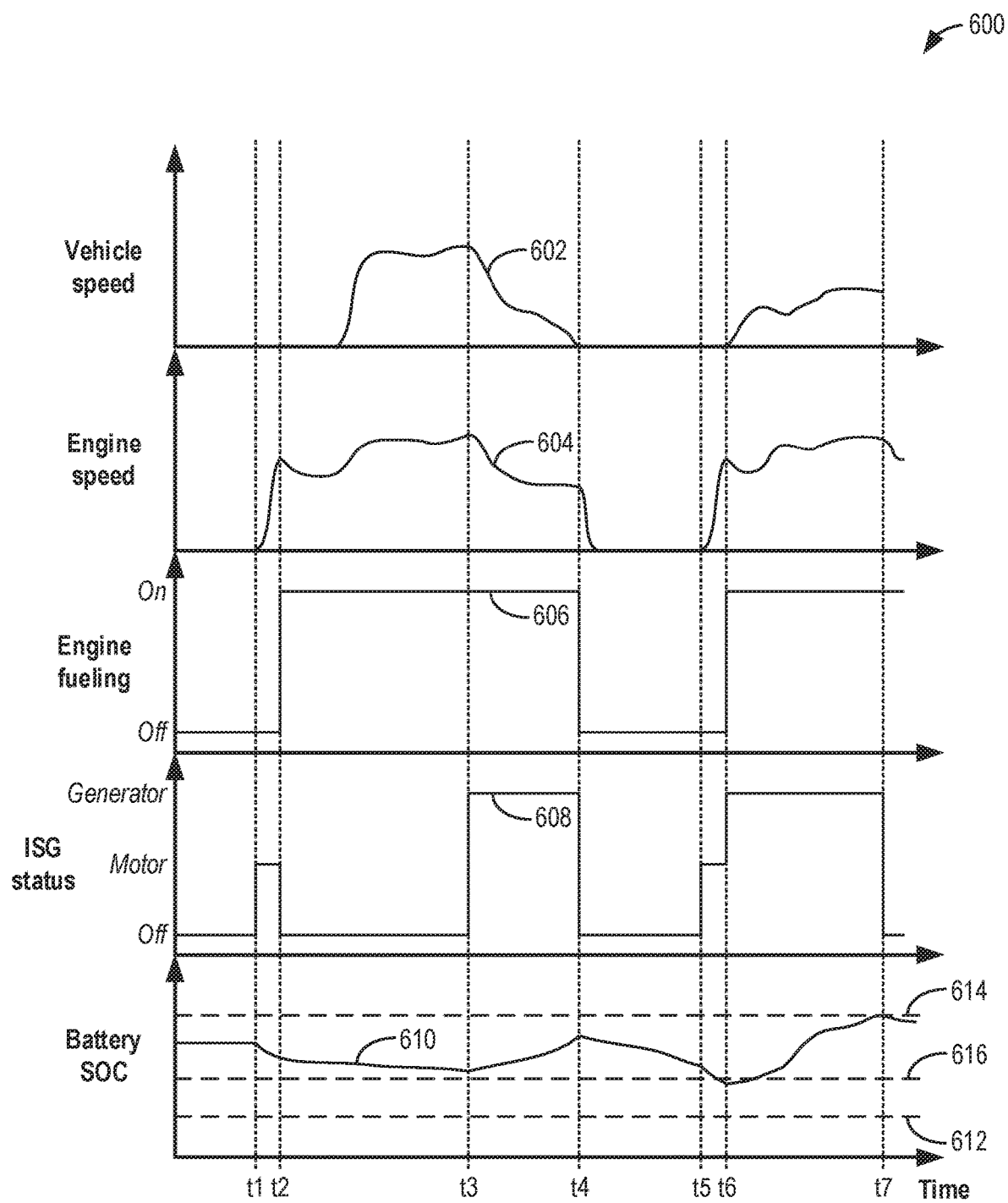
FIG. 6 shows a prophetic example timeline for adjusting operation of a belt-driven integrated starter/generator based on vehicle conditions.

The following description relates to systems and methods for an integrated starter/generator (ISG). The ISG may be rotationally coupled to an engine, such as the engine depicted in FIG. 1. Both the engine and the ISG may be included in a vehicle driveline (e.g., powertrain), such as the example driveline shown in FIG. 2. In particular, the ISG may be rotationally coupled to the engine via an accessory belt drive system that includes two separate belt drives and a bidirectional decoupler, such as the accessory belt drive system shown in FIG. 3. As illustrated in FIG. 4, the bidirectional decoupler may include two opposing decouplers for transferring torque to or from a shaft of the ISG. For example, a first decoupler may transfer torque from the ISG to a crankshaft of the engine via a first belt drive and may overrun when torque is transferred from the engine to the ISG. In contrast, a second decoupler may transfer torque from the crankshaft to the ISG via a second belt drive and may overrun when torque is transferred from the ISG to the engine. Thus, the first decoupler may engage with a shaft of the ISG when the ISG is operated as a motor, and the second decoupler may engage with the shaft of the ISG when the ISG is operated as a generator. An example method for operating the ISG as a motor and as a generator is shown at FIG. 5. FIG. 6 shows an example timeline for adjusting operation of the ISG based on vehicle operating conditions.

Figure 1:
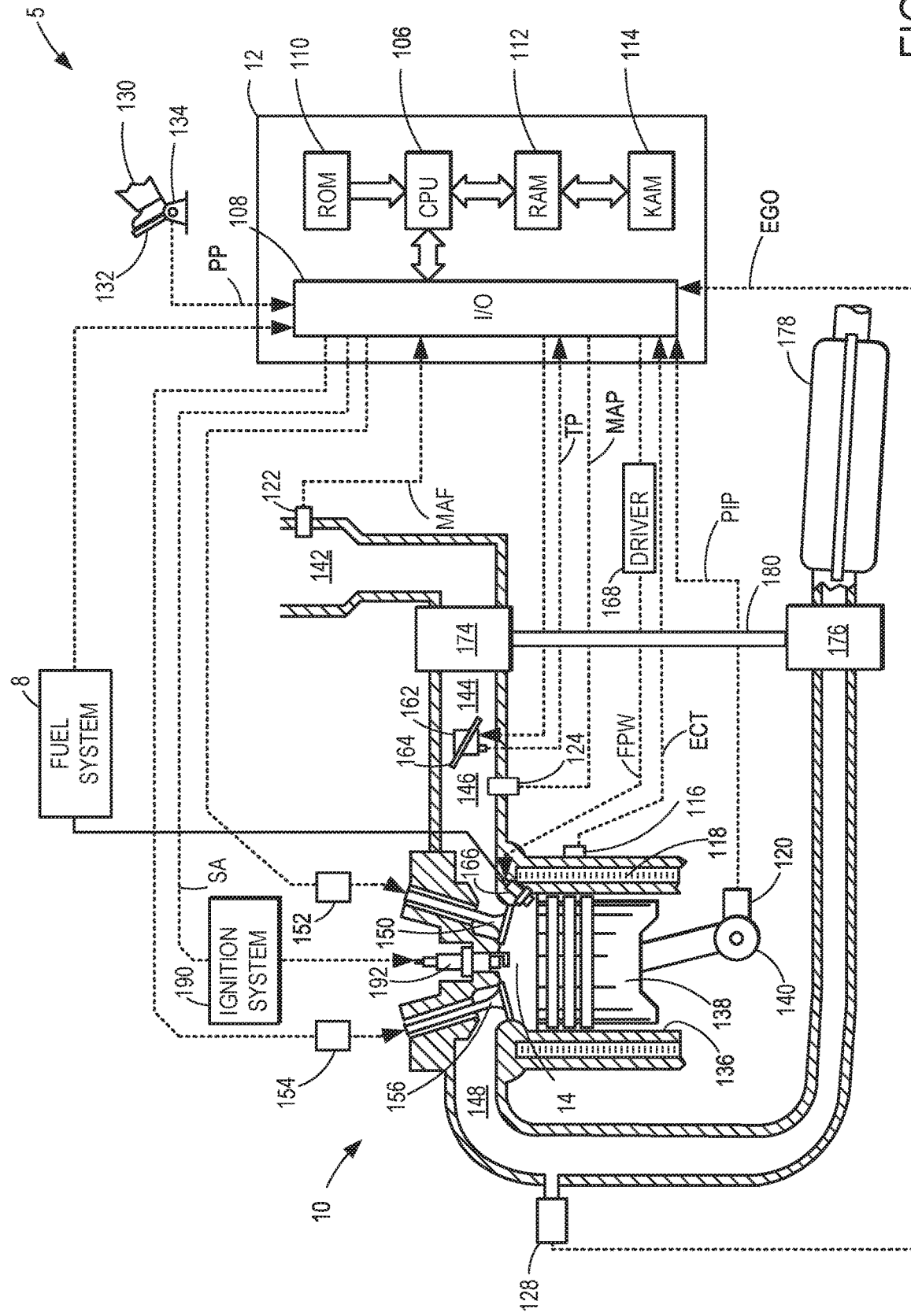
FIG. 1 schematically depicts an example cylinder of an internal combustion engine.

Turning now to the figures, FIG. 1 depicts an example configuration of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. In some examples, a starter motor (not shown in FIG. 1) may be coupled to crankshaft 140 via a flywheel to enable a starting operation of engine 10.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including one fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter referred to as "DI") of fuel into cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

It will be appreciated that in an alternative embodiment, fuel injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by fuel injector 166 to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vapor-ization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

In some examples, engine 10 may be coupled to an electric motor/battery system, as will be further described below with respect to FIG. 2. For example, vehicle 5 may be a mild hybrid vehicle equipped with a start-stop system, wherein engine 10 is selectively shut down by controller 12 responsive to engine auto-stop conditions (and without receiving a shutdown request from operator 130) and then restarted by controller 12 responsive to engine restart (e.g., auto-start) conditions (and without receiving a restart request from the operator).

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving signals from the various sensors, controller 12 may automatically restart the engine from an auto-stop, as further described below with respect to FIG. 5.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
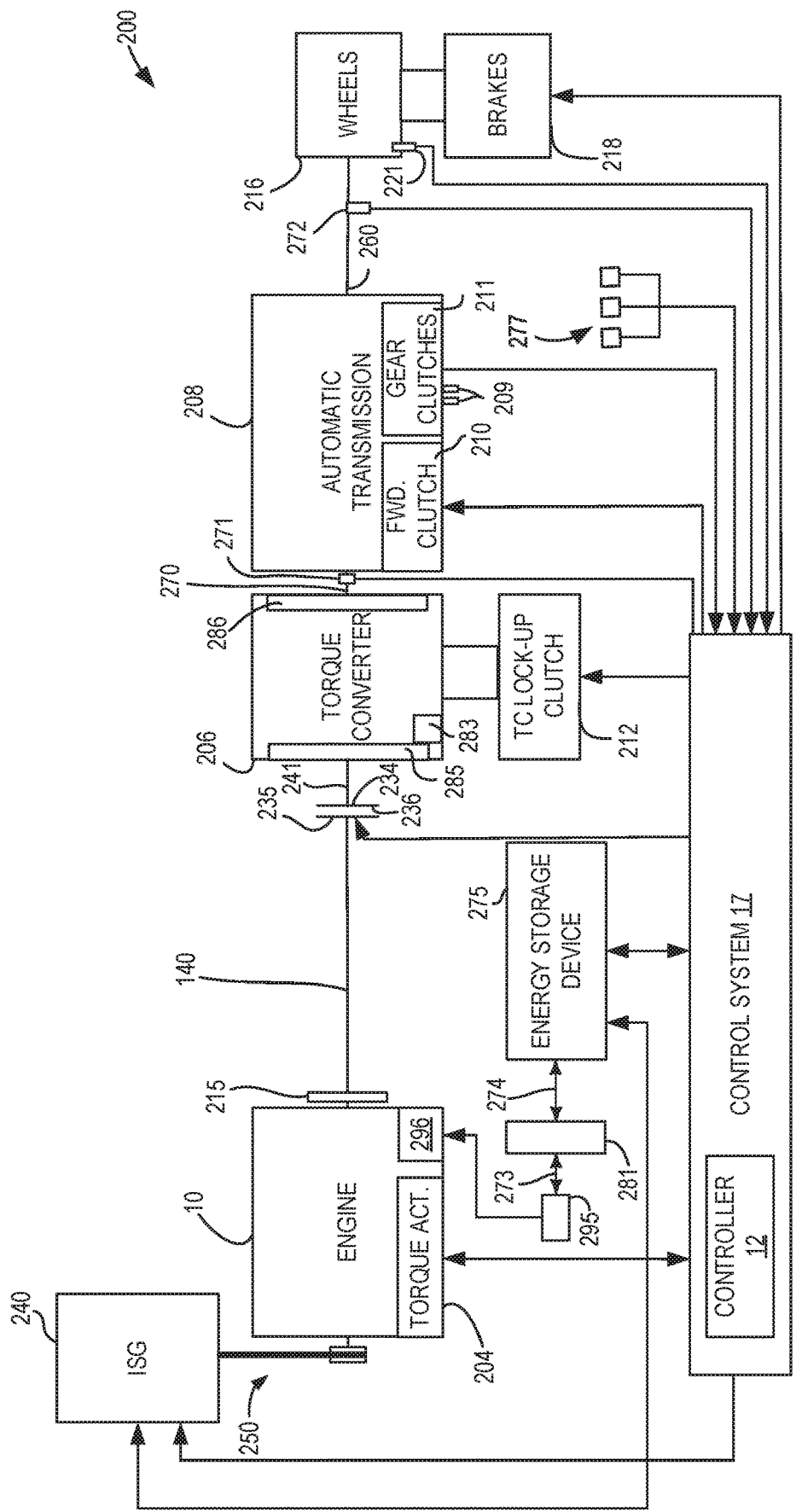
FIG. 2 is a schematic diagram of a vehicle driveline.

Continuing to FIG. 2, a block diagram is shown of a powertrain or driveline 200, which may be included in vehicle 5 of FIG. 1. Thus, similar components previously described with respect to FIG. 1 are numbered the same and may not be reintroduced. For example, the powertrain of FIG. 2 includes engine 10 shown in FIG. 1. Further, controller 12 is shown included in a control system 17. Although only one controller 12 is shown, control system 17 may include one or more controllers, including one or more of a vehicle system controller, an engine controller, an electric machine controller, a transmission controller, an energy storage device controller, and a brake controller, which may communicate over a controller area network of control system 17. Each of the controllers may provide information to other controllers, such as sensor data, actuator data, and diagnostic information. In some examples, the controllers may be configured in a hierarchy such that one controller is a primary controller that issues commands to one or more secondary controllers. As an example, the vehicle system controller may provide commands to the engine controller to achieve driver input requests and other requests that are based on vehicle operating conditions. In other examples, one or more of the various controllers described above may be integrated in a single controller, such as controller 12, as shown. Thus, controller 12 may serve as the vehicle system controller, the engine controller, the electric machine controller, the transmission controller, the energy storage device controller, and the brake controller. As another example, controller 12 may include the vehicle system controller and the engine controller as a single unit while the electric machine controller, the transmission controller, and the brake controller are standalone controllers. However, the partitioning of the controllers of control system 17 may be different than the examples specifically listed.

Powertrain 200 may be powered by engine 10 and an electric machine. In the example shown, the electric machine is an integrated starter/generator (ISG) 240 mechanically coupled to crankshaft 140 of engine 10 via an accessory belt drive system 250. Thus, ISG 240 is a belt-integrated starter/generator (BISG), with powertrain 200 shown as a P0 mild hybrid architecture. Accessory belt drive system 250 may include one or more decouplers, each decoupler including a separate belt sheave. For example, accessory belt drive system 250 may include two opposed decouplers, each configured to transmit torque in a single direction. Accessory belt drive system 250 will be further described below with respect to FIG. 3.

Engine 10 may be started via a starter motor 296 or via ISG 240. ISG 240 may be a high voltage electric machine (e.g., operated with a voltage ranging between 12 and 300 V), having a higher output torque capacity than starter motor 296, and may be motor and/or generator (e.g., a motor/generator). For example, ISG 240 may operate as a motor when supplied with electrical power via an energy storage device 275 in electrical communication with ISG 240. As another example, ISG 240 may operate as a generator when supplying electrical power to energy storage device 275. Thus, ISG 240 may be operated to provide torque to engine 10 or to convert engine torque into electrical energy to be stored in energy storage device 275 (e.g., in a regeneration mode). ISG 240 may provide a positive torque or a negative torque to engine 10 as instructed by control system 17. Energy storage device 275 may be a battery, a capacitor, or an inductor, for example. As examples, ISG 240 may be operated to pre-position engine 10 before starting to reduce an air spring effect of compression, to add negative torque to engine 10 during shutdown to bring the engine to rest faster, to position engine 10 post-shutdown to reduce the air spring effect of compression during a subsequent start, and to add additional positive torque to engine 10 for faster engine acceleration.

A bi-directional DC/DC converter 281 may transfer electrical energy from a high voltage bus 274 to a low voltage bus 273 or vice versa. A low voltage battery 295 is electrically coupled to low voltage bus 273. Energy storage device 275 is electrically coupled to high voltage bus 274. Low voltage battery 295 may selectively supply electrical energy to starter motor 296, for example, which may be a low voltage electric machine (e.g., operated with 12 V).

An engine output torque may be transmitted to an input or first side 235 of a powertrain disconnect clutch 236 through a dual mass flywheel 215. Disconnect clutch 236 may be electrically or hydraulically actuated. The first side 235 of disconnect clutch 236 is shown mechanically coupled to crankshaft 140, and a second, downstream side 234 of disconnect clutch 236 is shown mechanically coupled to a torque converter 206 via a shaft 241. Further, the torque produced by engine 10 may be adjusted via a torque actuator 204, which may be a fuel injector, a throttle, a spark plug, etc.

Torque converter 206 includes a turbine 286 configured to output torque to an input shaft 270. Input shaft 270 mechanically couples torque converter 206 to an automatic transmission 208. Torque converter 206 also includes a torque converter bypass lock-up clutch (TCC) 212. Torque is directly transferred from an impeller 285 to turbine 286 when TCC 212 is locked. TCC 212 may be electrically operated by control system 17. Alternatively, TCC 212 may be hydraulically locked. In one example, torque converter 206 may be referred to as a component of automatic transmission 208.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to input shaft 270 of transmission 208. Alternatively, the torque converter lock-up clutch 212 may be partially engaged, thereby enabling the amount of torque directly relayed to transmission 208 to be adjusted. Controller 12 may be configured to adjust the amount of torque transmitted by torque converter 206 by adjusting torque converter lock-up clutch 212 in response to various engine operating conditions and/or a driver-based request.

Automatic transmission 208 includes gear clutches (e.g., gears 1-10) 211 and a forward clutch 210. Automatic transmission 208 may be a fixed ratio transmission, for example. The gear clutches 211 and the forward clutch 210 may be selectively engaged to change a ratio of an actual total number of turns of input shaft 270 to an actual total number of turns of vehicle wheels 216. Gear clutches 211 may be engaged or disengaged via adjusting fluid supplied to the clutches via shift control solenoid valves 209. Torque output from the automatic transmission 208 may be relayed to vehicle wheels 216 to propel the vehicle via an output shaft 260.

Specifically, automatic transmission 208 may transfer an input driving torque at the input shaft 270 responsive to a vehicle traveling condition before transmitting an output driving torque to the vehicle wheels 216. Controller 12 (or a separate transmission controller of control system 17) selectively activates or engages TCC 212, gear clutches 211, and forward clutch 210. Controller 12 also selectively deactivates or disengages TCC 212, gear clutches 211, and forward clutch 210.

Torque converter 206 also includes a pump 283 that pressurizes fluid to operate disconnect clutch 236, forward clutch 210, and gear clutches 211. Pump 283 is driven via impeller 285, which rotates at a same speed as crankshaft 140 when disconnect clutch 236 is engaged.

Further, a frictional force may be applied to vehicle wheels 216 by engaging friction wheel brakes 218. In one example, friction wheel brakes 218 may be engaged in response to the driver depressing a brake pedal and/or in response to instructions within controller 12 or a separate brake controller of control system 17. In the same way, a frictional force applied to vehicle wheels 216 may be reduced by disengaging wheel brakes 218 in response to the driver releasing the brake pedal and/or in response to instructions and/or information received by control system 17.

In response to a request to accelerate the vehicle, controller 12 may obtain a driver demanded torque or power request from an accelerator pedal (e.g., accelerator pedal 132 shown in FIG. 1) or other device. Controller 12 (or a separate vehicle system controller of control system 17) may then allocate at least fraction of the requested driver demanded torque to engine 10 and the remaining fraction to ISG 240. If a total torque produced by both engine 10 and ISG 240 is less than an upper transmission input torque threshold (e.g., a torque value that may not be exceeded), the torque is delivered to torque converter 206, which then relays at least a fraction of the requested torque to transmission input shaft 270. Controller 12 selectively locks TCC 212 and engages gears via gear clutches 211 in response to shift schedules and TCC lockup schedules that may be based on input shaft torque and vehicle speed. In some conditions, such as when it is desired to charge energy storage device 275, a charging torque (e.g., a negative electric machine torque from ISG 240) may be requested while a non-zero driver demanded torque is present. Controller 12 may request increased engine torque to overcome the charging torque to meet the driver demand torque.

In response to a request to decrease vehicle speed and provide regenerative braking, controller 12 may provide a negative desired wheel torque based on vehicle speed and brake pedal position. Controller 12 may then allocate a fraction of the negative desired wheel torque to ISG 240 (e.g., a desired powertrain wheel torque) and the remaining fraction to friction brakes 218 (e.g., a desired friction brake wheel torque). Further, controller 12 may shift gears 211 based on a unique shifting schedule to increase regeneration efficiency. ISG 240 supplies a negative torque to crankshaft 140. Further, the negative torque of ISG 240 may be limited (e.g., constrained to less than a threshold negative torque) based on operating conditions of electric energy storage device 275, for example. Any portion of desired negative wheel torque that may not be provided by ISG 240 may be allocated to friction brakes 218 so that the desired wheel torque is provided by a combination of negative wheel torque from friction brakes 218 and ISG 240.

Further, as one example, an engine torque output may be controlled by adjusting a combination of spark timing, fuel pulse width, fuel pulse timing, and/or air charge (e.g., by controlling throttle opening and/or valve timing, valve lift and boost amount). In some examples, engine control may be performed on a cylinder-by-cylinder basis to control the engine torque output. Controller 12 (or a separate electric machine controller of control system 17) may control torque output and electrical energy production from ISG 240 by adjusting current flowing to and from field and/or armature windings of ISG 240, for example.

Controller 12 receives a transmission input shaft position via a position sensor 271. Controller 12 may convert the transmission input shaft position into input shaft speed via differentiating a signal from position sensor 271 or counting a number of known angular distance pulses over a predetermined time interval. Controller 12 may receive a transmission output shaft torque from a torque sensor 272. Alternatively, torque sensor 272 may be a position sensor or a combination of torque and position sensors. If torque sensor 272 is a position sensor, controller 12 may count shaft position pulses over a predetermined time interval to determine transmission output shaft velocity. Controller 12 may also differentiate transmission output shaft velocity to determine transmission output shaft acceleration. Controller 12 may also receive additional transmission information from sensors 277, which may include, but are not limited to pump output line pressure sensors, transmission fluid pressure sensors (e.g., gear clutch fluid pressure sensors), electric machine temperature sensors, and ambient temperature sensors. Further, controller 12 may receive wheel speed information via a wheel speed sensor 221.

Figure 3:
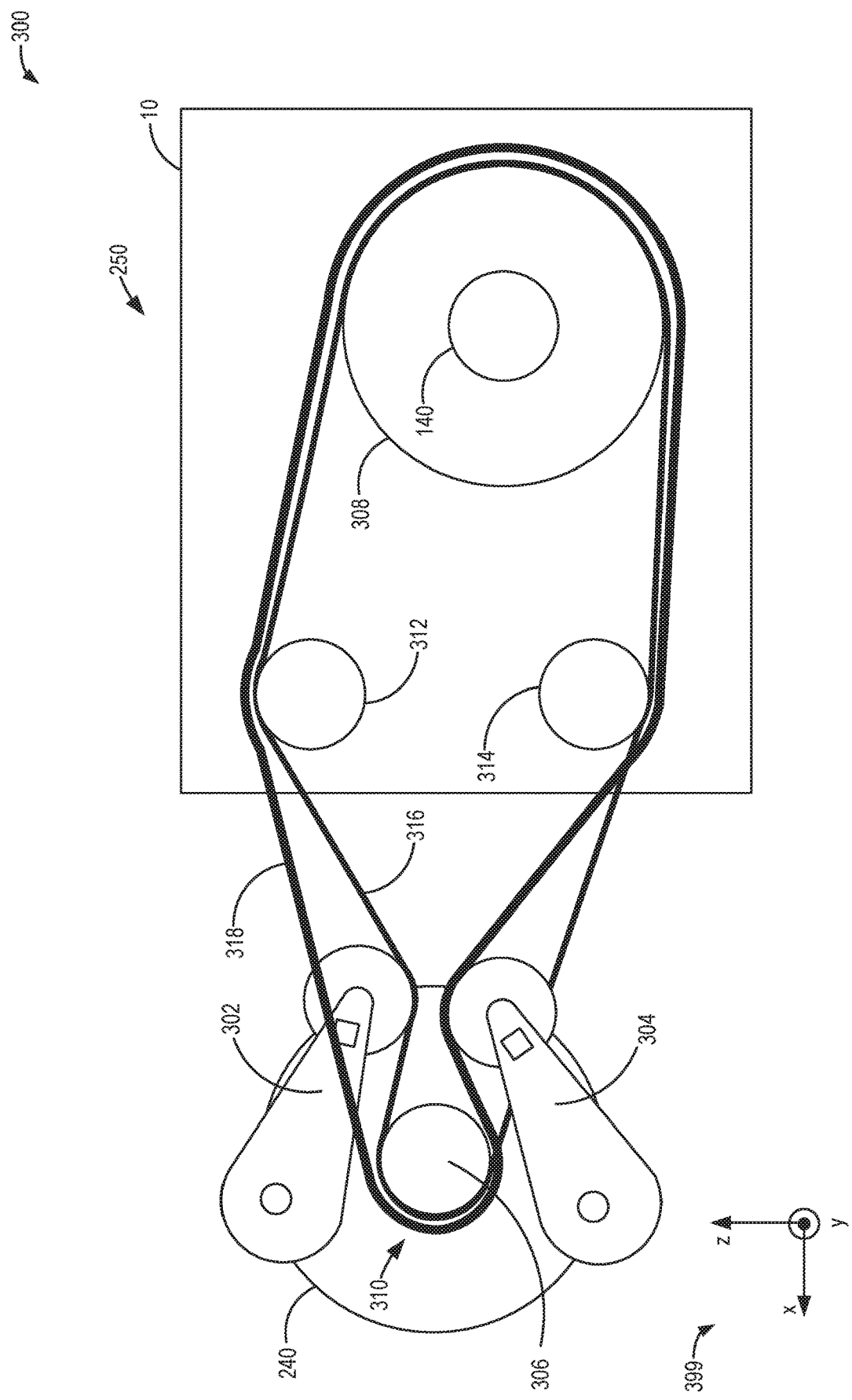
FIG. 3 schematically shows an accessory belt drive system that may be used to rotationally couple an engine to an integrated starter/generator.

Turning now to FIG. 3, a schematic view 300 of accessory belt drive system 250 introduced in FIG. 2 is shown. As such, components previously introduced in FIGS. 1 and 2 are numbered the same in FIG. 3 and may not be reintroduced. Further, reference axes 399 are provided for describing the relative arrangement of parts. For example, schematic view 300 shows accessory belt drive system 250 in the x-z plane, as indicated by reference axes 399, and is a two-dimensional representation of three-dimensional objects.

Accessory belt drive system 250 is shown as a belt and pulley system that includes a plurality of belts, pulleys, and tensioners. Specifically, schematic view 300 shows a first tensioner 302 and a second tensioner 304 each coupled to ISG 240, a shaft 306 of ISG 240 (also referred to as ISG shaft 306 herein), a bidirectional decoupler 310 positioned on ISG shaft 306, a first pulley 308 positioned on crankshaft 140, a second pulley 312 and a third pulley 314 each coupled to a housing of engine 10, a first belt 316 coupled to first tensioner 302, and a second belt 318 coupled to second tensioner 304.

First tensioner 302 includes a sheave for first belt 316 and may be a rear sheave used for engine starting, as will be elaborated herein. Second tensioner 304 includes a sheave for second belt 318 and may be a front sheave used for generating, as will also be elaborated herein. Each of first pulley 308, second pulley 312, and third pulley 314 may include separate sheaves for first belt 316 and second belt 318 so that first belt 316 and second belt 318 are non-overlapping at each pulley. For example, first belt 316 may be positioned on a first, rear sheave of each pulley, and second belt 318 may be positioned on a second, front sheave of each pulley that is horizontally (e.g., in the x-direction) and vertically (e.g., in the z-direction) aligned with the first sheave and positioned further out of the page (e.g., in the positive y-direction) than the first sheave. As another example, first pulley 308, second pulley 312, and third pulley 314 may each include two individual pulleys stacked in the y-direction (e.g., out of the page). Note that for illustrative clarity, second belt 318 is shown spaced apart from and thicker than first belt 316, although it may be understood that second belt 318 is in physical contact with each of first pulley 308, second pulley 312, and third pulley 314 on the corresponding sheave and may have a same or different thickness as first belt 316. Further, as will be described below with respect to FIG. 4, bidirectional decoupler 310 includes a separate decoupler for first belt 316 and second belt 318. Each belt and the corresponding decoupler, pulley sheaves, tensioner, etc. that are used to transfer torque between crankshaft 140 and ISG shaft 306 will be collectively referred to as a belt drive herein (e.g., a first belt drive for first belt 316, first tensioner 302, etc., and a second belt drive for second belt 318, second tensioner 304, etc.).

Each of first belt 316 and second belt 318 may be a multiple-V belt, and each sheave may include a grooved outer surface shaped to engage each belt. It may be understood, however, that each belt and the outer surface of each sheave may have any other suitable configuration. For example, first belt 316 and second belt 318 may each include a single-V configuration, and each sheave may include a single groove. As another example, first belt 316 and second belt 318 each may be configured as a flat belt, and each sheave may include a generally flat portion for engaging the flat belt. In still other examples, first belt 316 and second belt 318 may have different configurations, and the corresponding sheaves may be configured accordingly. For example, first belt 316 may be a multiple-V belt, and the sheave of first tensioner 302 (along with the corresponding rear sheaves on each of first pulley 308, second pulley 312, and third pulley 314) may include multiple grooves, whereas second belt 318 may be a single-V belt, and the sheave of second tensioner 304 (along with the corresponding front sheaves on each of first pulley 308, second pulley 312, and third pulley 314) may include a single groove.

Further, because the belt drives are independent from each other, the rear sheaves on one or more of first pulley 308, second pulley 312, and third pulley 314 may have a different diameter than the front sheaves, resulting in a different pulley ratio for the first belt drive and the second belt drive. As one example, the first belt drive may have a larger pulley ratio than the second belt drive to increase cranking torque during engine starts. As another example, the second belt drive may have a smaller pulley ratio than the first belt drive to enable regeneration at low engine speeds.

As illustrated by schematic view 300, first tensioner 302 may hold a first span of first belt 316 between bidirectional decoupler 310 and second pulley 312 tight, no matter whether ISG 240 is applying torque to crankshaft 140 or receiving torque from crankshaft 140. For example, when ISG 240 is driving the crankshaft 140 in the clockwise direction, the first span of first belt 316 would be slack if not held tight by first tensioner 302. Similarly, second tensioner 304 may hold a second span of second belt 318 between bidirectional decoupler 310 and third pulley 314 tight, no matter whether ISG 240 is applying torque to crankshaft 140 or receiving torque from crankshaft 140. For example, when crankshaft 140 is driving ISG 240, the second span of second belt 318 would be slack if not held tight by second tensioner 304. Further, first tensioner 302 maintains tension in first belt 316 independently from second tensioner 304, which maintains tension in second belt 318 independently from first tensioner 302. Thus, accessory belt drive system 250 includes two isolated belt drives to transmit torque from ISG 240 to crankshaft 140 (e.g., via first belt 316) and transmit torque from crankshaft 140 to ISG 240 (e.g., via second belt 318), and each belt drive maintains tension across operating conditions to enable faster transitions between providing torque and receiving torque at ISG 240 compared with a single belt drive.

Continuing to FIG. 4, a sectional view 400 schematically shows bidirectional decoupler 310. As such, components previously introduced in FIGS. 2 and 3 are numbered the same in FIG. 4 and may not be reintroduced. Further, as shown by reference axes 399, sectional view 400 shows bidirectional decoupler 310 in the y-z plane, perpendicular to schematic view 300 of FIG. 3, and is a two-dimensional representation of three-dimensional objects. Note that for illustrative clarity, belts (e.g., first belt 316 and second belt 318) and tensioners (e.g., first tensioner 302 and second tensioner 304) introduced in FIG. 3 are not shown in FIG. 4, although they may be understood to be present.

Bidirectional decoupler 310 includes a first overrunning decoupler pulley 402 (also referred to herein as a first decoupler 402) and a second overrunning decoupler pulley 404 (also referred to herein as a second decoupler 404) positioned a common hub 405 that is directly mounted on ISG shaft 306. For example, hub 405 may have a shaft-mounting aperture therethrough that is shaped to engage with corresponding features of ISG shaft 306. The shaft-mounting aperture may couple hub 405 to an end of ISG shaft 306 for co-rotation of hub 405 and ISG shaft 306 about a common axis A. Further, hub 405 may be retained in place by a retainer 426 and a seal cap 428 positioned on a distal end of ISG shaft 306 to cover the distal end and prevent intrusion of dirt and debris into the interior space of bidirectional decoupler 310.

First decoupler 402 is a rear sheave of bidirectional decoupler 310 (e.g., in a more negative y-direction than second decoupler 404) that transfers torque in a first direction, as indicated by an arrow 401, and second decoupler 404 is a front sheave of bidirectional decoupler 310 (e.g., in a more positive y-direction than first decoupler 402) that transfers torque in a second, opposite direction, as indicated by an arrow 403. Further, first decoupler 402 may be rotationally coupled to first belt 316 introduced in FIG. 3, and second decoupler 404 may be rotationally coupled to second belt 318 introduced in FIG. 3. That is, first decoupler 402 may transmit torque from ISG 240 to crankshaft 140 (not shown in FIG. 4) via first belt 316 and may overrun (e.g., "freewheel") when a speed of crankshaft 140 increases beyond a speed of ISG shaft 306, and second decoupler 404 may transmit torque from crankshaft 140 to ISG 240 via second belt 318 and may overrun when the speed of crankshaft 140 decreases below the speed of ISG shaft 306, as will be elaborated below. Thus, each decoupler of bidirectional decoupler 310 transfers torque in one direction, with the direction of torque transfer opposite from the other decoupler. Note that the crankshaft, and thus ISG shaft 306, may spin in one rotational direction; therefore, the first direction and the second direction do not refer to the absolute rotational direction of the system, but may refer to a direction of change in the rotation (such as due to increasing rotational speed or decreasing rotational speed).

Second decoupler 404 is shown as a non-superimposable mirror image of first decoupler 402 (e.g., reflected about a vertical axis). Therefore, for simplicity, the components of first decoupler 402 will be described in detail, with the corresponding component of second decoupler 404 provided in parentheses.

First decoupler 402 includes a pulley 406 (second decoupler 404 includes a pulley 408) rotatably coupled to hub 405. Pulley 406 (pulley 408) has an outer surface shaped to engage first belt 316 (second belt 318). The outer surface is shown having grooves 407 (grooves 409 for second decoupler 404). The first belt 316 (second belt 318) may thus be a multiple-V belt. However, as mentioned above with respect to FIG. 3, the outer surface of the pulley 406 (pulley 408) may have any other suitable configuration, and the first belt 316 (second belt 318) may not be a multiple-V belt. For example, pulley 406 (pulley 408) may have a single groove when first belt 316 (second belt 318) is a single-V belt, or pulley 406 (pulley 408) may have a generally flat portion for engaging a flat belt. Pulley 406 (pulley 408) further includes an inner surface, which may engage with a clutch spring 410 (a clutch spring 412) in order to couple pulley 406 (pulley 408) and hub 405 together, as will be elaborated below. Pulley 406 (pulley 408) may be made from any suitable material, such as a steel, aluminum, or a polymeric material.

A first bearing member 422 (a first bearing member 424 for second decoupler 404) rotatably supports pulley 406 (pulley 408) on hub 405 at a first axial end of pulley 406 (pulley 408). First bearing member 422 (first bearing member 424) may be any suitable type of bearing member, such as a nylon or metallic bushing or a ball bearing. A second bearing member 430 (a second bearing member 432 for second decoupler 404) is positioned at a second, opposite axial end of pulley 406 (pulley 408) so as to rotatably support the pulley 406 (pulley 408) on a pulley support surface of hub 405. Second bearing member 430 (second bearing member 432) may mount to pulley 406 (pulley 408) and to hub 405 in any suitable ways. In the example shown in FIG. 4, second bearing member 430 (second bearing member 432) is molded around the pulley support surface (e.g., by an injection molding process wherein hub 405 forms part of the mold) and can rotate about hub 405.

An isolation spring 418 (an isolation spring 420 for second decoupler 404) is provided to accommodate oscillations in the speed of first belt 316 (second belt 318) relative to ISG shaft 306. Isolation spring 418 (isolation spring 420) may be a helical torsion spring that has a first helical end that is held in an annular slot that abuts a radially extending driver wall on a carrier 434 (a carrier 436 for second decoupler 404) and a second helical end that engages a similar driver wall on hub 405. In the example shown, isolation spring 418 (isolation spring 420) has a plurality of coils between the first and second ends. The coils may be spaced apart by a selected amount, and isolation spring 418 (isolation spring 420) may be under a selected amount of axial compression so that the first and second helical ends are abutted with the respective walls on carrier 434 (carrier 436) and hub 405. A thrust plate 438 (a thrust plate 440 for second decoupler 404) may be provided to receive the axial thrust force of carrier 434 (carrier 436) resulting from the axial compression of isolation spring 418 (isolation spring 420). Alternatively, instead of a helical torsion spring, isolation spring 418 (isolation spring 420) may be a compression spring. As a further alternative, isolation spring 418 (isolation spring 420) may be one of two or more isolation springs, each of which is a compression spring.

Isolation spring 418 (isolation spring 420) may be made from any suitable material, such as a suitable spring steel, and may have any suitable cross-sectional shape. For example, isolation spring 418 (isolation spring 420) is shown as having a generally rectangular cross-sectional shape, which confers a relatively high torsional resistance (e.g., spring rate) for a given occupied volume. However, other suitable spring rates may be obtained with other cross-sectional shapes, such as a circular cross-sectional shape or a square cross-sectional shape.

In the example shown in FIG. 4, a sleeve 414 (a sleeve 416) is provided between isolation spring 418 (isolation spring 420) and clutch spring 410 (clutch spring 412). As shown, sleeve 414 (sleeve 416) may be a helical member, although other suitable configurations are also possible (e.g., a hollow cylindrical shape). For example, sleeve 414 (sleeve 416) may be included in examples where the isolation spring is a torsion spring, in which sleeve 414 (sleeve 416) acts as a torque limiter by limiting an amount of room available for radial expansion of isolation spring 418 (isolation spring 420). Thus, when a torque is provided by pulley 406 (pulley 408) that exceeds a selected limit, the isolation spring 418 (isolation spring 420) expands until it is constrained by sleeve 414 (sleeve 416).

In the example of FIG. 4, clutch spring 410 (clutch spring 412) is a one-way wrap spring clutch comprising a helical wrap spring. Clutch spring 410 (clutch spring 412) has a first end that is engageable with a radial wall of carrier 434 (carrier 436) and may be fixedly connected to carrier 434 (carrier 436), whereas a second, opposite end of clutch spring 410 (clutch spring 412) may be free floating. Because first decoupler 402 transfers torque in the first direction and second decoupler 404 transfers torque in the second direction, first decoupler 402 and second decoupler 404 will again be described separately.

For first decoupler 402, when a torque is applied from ISG shaft 306 to hub 405 (e.g., by supplying current to ISG 240) so that hub 405 rotates at a speed that is faster than pulley 406, friction between the inner surface of pulley 406 and the coils of clutch spring 410 drives at least one of the coils of clutch spring 410 at least some angle in a first rotational direction about the axis A relative to the first end of clutch spring 410 (e.g., the end fixed to carrier 434). The movement between the one or more coils relative to the first end causes the clutch spring to expand radially, which increases a grip between the coils of clutch spring 410 and the inner surface of pulley 406 to couple pulley 406 to hub 405. Carrier 434 transmits the torque from hub 405 to clutch spring 410 through isolation spring 418. In turn, the first end of clutch spring 410 transmits the torque from carrier 434 to pulley 406. As a result, pulley 406 reaches the speed of hub 405. Additionally, pulley 406 applies the torque from ISG shaft 306 to first belt 316, which may in turn apply torque to the engine crankshaft (e.g., via first pulley 308 shown in FIG. 3). Thus, when hub 305 rotates faster than pulley 406, clutch spring 410 operatively connects pulley 406 to carrier 434 and therefore to hub 405. In contrast, when pulley 406 rotates faster than hub 405, such as may occur when engine speed (and thus crankshaft speed) increases, clutch spring 410 contracts radially, decreasing the grip between the coils of clutch spring 410 and the inner surface of pulley 406. As a result, torque transfer does not occur between pulley 406 and hub 405, and pulley 406 may freewheel.

For second decoupler 404, when a torque is applied from second belt 318 to pulley 408 to drive pulley 408 at a speed that is faster than that of ISG shaft 306, friction between the inner surface of pulley 408 and the coils of clutch spring 412 drives at least one of the coils of clutch spring 412 at least some angle in a second rotational direction about the axis A relative to the first end of clutch spring 412 (e.g., the end fixed to carrier 436). The movement between the one or more coils relative to the first end causes the clutch spring to expand radially, which increases a grip between the coils of clutch spring 412 and the inner surface of pulley 408 to couple pulley 408 to hub 405. As a result, the first end of clutch spring 412 transmits the torque from pulley 408 to carrier 436. Carrier 436 in turn transmits the torque to hub 405 through isolation spring 420. As a result, hub 405 reaches the speed of pulley 408. Thus, when pulley 408 rotates faster than hub 405, clutch spring 412 operatively connects pulley 408 to carrier 436, and therefore to hub 405. In contrast, when hub 405 rotates faster than pulley 408, such as may occur when engine speed (and thus crankshaft speed) decreases, clutch spring 412 contracts radially, decreasing the grip between the coils of clutch spring 412 and the inner surface of pulley 408. Thus, when hub 405 rotates faster than pulley 408, pulley 408 is not operatively connected to hub 405. As a result, torque transfer does not occur between pulley 408 and hub 405, and pulley 408 may freewheel.

Thus, the first belt drive, including the first belt and the first decoupler, transfers torque between the ISG and the engine (e.g., between the ISG shaft and the crankshaft) in only a first torque transfer direction, and the second belt drive, including the second belt and the second decoupler, transfers torque between the ISG and the engine in only a second torque transfer direction that is opposite the first torque transfer direction. In this way, the two belt drives independently engage (e.g., couple) and disengage (e.g., decouple) with the ISG shaft.

Next, FIG. 5 shows an example method 500 for adjusting operation of a belt-driven ISG having a two separate belt drives and a bidirectional decoupler based on vehicle and engine operating conditions. For example, the ISG may be ISG 240 driven by accessory belt drive system 250 described in FIGS. 2-4, and the bidirectional decoupler may be bidirectional decoupler 310 described in FIGS. 3 and 4. Instructions for carrying out method 500 may be executed by a controller (e.g., controller 12 of FIGS. 1 and 2) based on instructions stored on a memory of the controller and in conjunction with signals received from sensors of the engine system, such as the sensors described above with reference to FIGS. 1 and 2. The controller may employ engine actuators of the engine system to adjust engine operation according to the methods described below.

At 502, method 500 includes estimating and/or measuring operating conditions. The operating conditions may include both vehicle and engine operating conditions, for example, vehicle speed, a state of charge (SOC) of a system battery (e.g., energy storage device 275 of FIG. 2), engine status, engine load, engine temperature, engine speed, driver-demanded torque, vehicle ignition status, etc. The operating conditions may be measured or inferred based on available data. For example, the SOC may be inferred as a percentage charge of a total charge capacity. The engine status may refer to whether the engine is on (e.g., operating at a non-zero speed, with combustion occurring within engine cylinders) or off (e.g., at rest, without combustion occurring in the engine cylinders). The vehicle ignition status may refer to a position of an ignition switch. As an example, the ignition switch may be in an "off" position, indicating that the vehicle is off (e.g., powered down, with a vehicle speed of zero), or in an "on" position, in which the vehicle is on (e.g., with power supplied to vehicle systems). The state of the engine and the state of the vehicle may be different. For example, the vehicle may be on while the engine is off during an auto-stop. In one example, the vehicle may be at rest when the engine auto-stop is performed. In another example, the vehicle may be in motion (e.g., coasting) when the engine auto-stop is performed.

At 504, method 500 includes determining if an engine start has been requested. For example, an engine start may be requested by a vehicle operator switching the ignition switch to an "on" position, such as by turning the ignition key, depressing an ignition button, or requesting an engine start from a remote device (such as a key-fob, smartphone, a tablet, etc.). In another example, an engine start may be requested by the controller to restart the engine from an auto-stop. For example, the controller may request the engine start responsive to the SOC dropping below a first threshold SOC. The first threshold SOC may be a positive, non-zero battery SOC below which the system battery may not be able to support or execute additional vehicle functions during the auto-stop and/or restart the engine (e.g., 30%). As another example, the controller may request the engine start responsive to the driver-demanded torque increasing above a threshold torque during the auto-stop. The threshold torque may be a positive, non-zero amount of torque corresponding to a request from the driver to propel the vehicle.

If an engine start has not been requested, method 500 proceeds to 506 and includes determining if the engine is on. For example, an engine start may not be requested when the engine is already on. As another example, an engine start may not be requested when the engine is of and is to remain off (e.g., such as following a key-off event or during an engine auto-stop). Thus, the controller may differentiate between two conditions where an engine start is not requested in order to adjust ISG operation accordingly.

If the engine is not on, method 500 proceeds to 508 and includes maintaining the engine off. For example, the engine will remain at rest (e.g., having an engine speed of zero), without combustion occurring in engine cylinders. With the engine off and without an engine start requested, the ISG will remain deactivated (e.g., off) and will not be operated. Method 500 may then end. As one example, method 500 may be repeated, such as in response to a change in operating conditions (e.g., a change in the ignition state of the vehicle) so that ISG operation may be adjusted as operating conditions change.

Returning to 504, if an engine start has been requested, method 500 proceeds to 510 and includes operating the ISG as a motor to crank the engine. For example, the controller may supply electrical power from the system battery to the ISG to operate the ISG as the motor. As current flows through windings of the ISG, it produces a magnetic field that interacts with permanent magnets of the ISG, causing a shaft of the ISG to rotate. Thus, electrical power is converted to mechanical power when the ISG is operated as a motor. Further, a speed of the ISG shaft rotation may be adjusted by adjusting the current flow through the windings. When the ISG is operated to crank the engine, the ISG may be operated at a maximum speed in order to quickly increase the speed of the engine to a desired speed, at least in some examples.

Cranking the engine includes applying torque from the shaft of the ISG to a crankshaft of the engine via a first belt drive, as indicated at 512. As described above with respect to FIGS. 3 and 4, the first belt drive, which includes a first belt (e.g., first belt 316 of FIG. 3) and a first decoupler of the bidirectional decoupler (e.g., first decoupler 402 of FIG. 4), may transfer torque in a first torque transfer direction from the shaft of the ISG (e.g., ISG shaft 306 of FIGS. 3 and 4) to the first belt, which in turn transfers torque to a crankshaft of the engine (e.g., crankshaft 140 of FIGS. 1-3). For example, the ISG shaft may engage with a first pulley (e.g., sheave) of the first decoupler via a first clutch spring, which operatively connects the ISG shaft (e.g., via a co-rotational hub mounted thereon) to the first pulley only when the ISG shaft rotates faster than the first pulley. Further, a first tensioner (e.g., first tensioner 302 of FIG. 3) may hold the first belt tight for efficient torque transmission from the ISG shaft to the belt and the belt to the crankshaft. Thus, as the speed of the ISG shaft increases when the ISG is operated as a motor, the speed of the first belt, and thus the engine crankshaft, increases due to torque transfer via the first decoupler.

Method 500 at 510 also includes maintaining tension in a second belt drive via a second tensioner (e.g., second tensioner 304 of FIG. 3) without torque transmission, as indicated at 514. The second belt drive may include a second decoupler of the bidirectional decoupler (e.g., second decoupler 404 of FIG. 4), which further includes a second pulley (e.g., sheave) for a second belt (e.g., second belt 318 of FIG. 3). The second decoupler may freewheel without engaging with the shaft of the ISG while the ISG is operated to crank the engine (e.g., in the first torque transfer direction) and may only engage with the shaft of the ISG in a second torque transfer direction, which is opposite the first torque transfer direction. For example, the ISG shaft may remain decoupled from the second pulley via a second clutch spring that operatively disconnects the second pulley from the ISG shaft when the ISG shaft rotates faster than the second pulley. In this way, torque is not transferred between the ISG shaft and the crankshaft via the second belt and the second decoupler when the ISG is operated as a motor. However, by holding tension in the second belt with the second tensioner, the belt drive system is ready to instantaneously transition from driving the engine with torque from the ISG to driving the ISG with torque from the engine.

At 516, method 500 includes commencing combustion in the engine. For example, fuel may be supplied to the engine cylinders and ignited (e.g., via a spark plug coupled to each cylinder) to produce a combustion reaction. As one example, fuel and spark may be provided once the engine is cranked to a desired speed by operating the ISG as a motor.

At 518, method 500 includes deactivating the ISG. For example, as combustion commences in the engine, the engine crankshaft may transition from being driven by torque from the ISG via the first belt drive to being driven by combustion. Therefore, the supply of electrical power to the ISG may be discontinued to deactivate the ISG, removing the ISG-supplied torque to the belt drive system (e.g., removing torque from the first torque transfer direction). Deactivating the ISG further includes isolating the first belt drive from the ISG shaft via the first decoupler while maintaining tension in the first belt via the first tensioner, as indicated at 520. As discussed above, the first decoupler may only be engaged in with the ISG shaft in the first torque transfer direction. For example, the crankshaft may accelerate as the engine accelerates due to combustion, thereby applying torque to the first belt in the second torque transfer direction. The application of torque to the first belt in the second torque transfer direction may cause the clutch spring of the first decoupler to disengage with the ISG shaft to decouple the first pulley from the ISG shaft. The first decoupler thus is not engaged during operation in the second torque transfer direction, and the first decoupler may rotate (e.g., overrun) without transferring torque between the first belt and the ISG shaft (e.g., in the second torque transfer direction).

Returning to 506, if the engine is on (e.g., the engine was already on, or the engine was started at 504), method 500 proceeds to 524 and includes determining if operating in a regeneration mode is indicated. As one example, operating in the regeneration mode may be indicated to provide regenerative breaking, such as in response to a request to decrease vehicle speed by providing a negative wheel torque by the ISG. As another example, operating in the regeneration mode may additionally or alternatively include the SOC of the system battery being less that a second, higher threshold SOC. The second threshold SOC may be a pre-determined, non-zero charge percentage that prevents overcharging of the system battery, for example. Thus, when the SOC of the system battery is less than the second threshold SOC, the system battery may be able to accept charge generated by the ISG, and when the SOC of the system battery is greater than or equal to the second threshold SOC, the system battery may be considered fully charged. In some examples, operating in the regeneration mode may additionally or alternatively be requested in response to the SOC of the system battery decreasing below a third threshold SOC. The third threshold SOC may be a pre-determined, non-zero charge percentage that is greater than the first threshold SOC and less than the second threshold SOC, for example. The regeneration mode may be requested responsive to reaching the third threshold SOC to ensure that sufficient battery charge is available for powering auxiliary vehicle systems (for example, lights, entertainment system, etc.).

If operating in the regeneration mode is not indicated, method 500 proceeds to 526 and includes continuing combustion in the engine with the ISG deactivated. For example, the ISG may be maintained in a neutral mode, where the ISG is not actively operated as a motor nor actively operated as a generator. Electrical power may not be supplied to the ISG from the system battery or to the system battery from the ISG. However, it may be noted that the ISG shaft speed will roughly follow the crankshaft speed while the ISG is deactivated and in the neutral mode.

As an example, operating with the ISG deactivated includes engaging the second belt drive and overrunning the first belt drive responsive to crankshaft acceleration, as indicated at 528. Additionally, the ISG will be driven by the second belt and the second decoupler when the engine is at constant speed due to small torque requirements for driving the ISG rotor on its bearings. By overrunning the first belt drive via the first decoupler, the first belt drive is not used to transfer torque from the ISG shaft to the engine crankshaft, and torque is not transferred between the ISG and the engine in the first torque transfer direction.

As another example, operating with the ISG deactivated further includes engaging the first belt drive and overrunning the second belt drive responsive to a crankshaft speed decrease, as indicated at 530. For example, if the engine rapidly slows down (e.g., during a transmission shift), then the first belt will engage via the first decoupler while the second belt will disengage via the second decoupler. By overrunning the second belt drive via the second decoupler, the second belt drive is not used to transfer torque from the engine crankshaft to the ISG shaft, and torque is not transferred between the ISG and the engine in the second torque transfer direction. Method 500 may then end.

Returning to 524, when the regeneration mode is indicated, method 500 proceeds to 532 and includes operating the ISG as a generator to charge the system battery. This includes applying torque from the engine crankshaft to the ISG shaft via the second belt drive, as indicated at 534, and maintaining tension in the first belt drive via the first tensioner without torque transmission, as indicated at 536. As described above with respect to FIGS. 3 and 4, the second belt may transfer torque from the crankshaft to the second decoupler (e.g., in the second torque transfer direction), which in turn transfers torque to the ISG shaft through engagement of the second clutch spring. For example, the ISG shaft may engage with the second clutch spring to operatively connect the ISG shaft (e.g., via the co-rotational hub mounted thereon) to the second pulley in the second torque transfer direction only when the crankshaft rotates faster than the second pulley. Further, the second tensioner may hold the second belt tight for efficient torque transmission from the crankshaft to the belt and from the belt to the ISG shaft (e.g., via the engaged second decoupler in the second torque transfer direction).

Further still, operating the ISG as a generator may include the ISG applying a negative torque on the engine crankshaft via the second belt drive. As such, when regenerative breaking is not occurring, engine operating parameters may be adjusted to increase engine torque output in order to meet the driver-demanded torque. As one example, one or more of a fuel injection amount and/or timing, a spark timing, and a throttle position may be adjusted to increase the engine torque output. In contrast, when the ISG is used for regenerative breaking, the engine torque output may not be increased. By applying torque to the ISG shaft from the second belt drive, the ISG shaft may be rotated, inducing electric current in the windings that may be supplied to the system battery and/or supplied directly to the auxiliary vehicle systems. In some examples, the speed of the ISG rotation may be adjusted to adjust the amount of electric current produced.

In contrast, the first decoupler may freewheel without engaging with the shaft of the ISG while the ISG is operated as a generator and torque is transferred between the ISG and the engine in the second torque transfer direction. For example, the ISG shaft may remain disengaged from the first pulley via the first clutch spring that operatively disconnects the first pulley from the ISG shaft when the crankshaft rotates faster than the first pulley. In this way, torque is not transferred between the ISG shaft and the crankshaft via the first belt and the first decoupler in the second torque transfer direction, when the ISG is operated as a generator. However, by holding tension in the first belt with the first tensioner during torque transfer in the second torque transfer direction, the belt drive system is ready to instantaneously transition from driving the ISG with torque from the engine to driving the engine with torque from the ISG. Method 500 may then end.

In this way, the ISG may be quickly transitioned between operating as a motor and operating as a generator without producing high hubloads at pulleys in the belt drive system, thereby reducing belt drive system degradation. Further, the system enables tensioners on independent belt drives (e.g., the first belt drive and the second belt drive) to maintain tension at all times, even when the belt drive is not transmitting torque, such as when the corresponding decoupler is overrunning. By maintaining tension in each belt drive, the ISG may instantaneously switch between driving the belt drive system (e.g., being operated as a motor and producing torque in the first torque transfer direction) and being driven by the belt drive system (e.g., being operated as a generator and receiving torque in the second, opposite torque transfer direction) for reduced response times.

Next, FIG. 6 shows an example timeline 600 for adjusting operation of a belt-driven ISG (e.g., ISG 240 of FIGS. 2-4) based on vehicle conditions. Vehicle speed is shown in plot 602, engine speed is shown in plot 604, engine fueling is shown in plot 606, a status of the ISG is shown in plot 608, and a SOC of a system battery is shown in plot 610. For all of the above, the horizontal axis represents time, with time increasing along the horizontal axis from left to right. The vertical axis represents each labeled parameter. For plots 602, 604, and 610, a magnitude of the labeled parameter increases along the vertical axis from bottom to top. For plot 606, the vertical axis represents whether engine fueling is "on" (e.g., fuel is supplied to the engine) or "off," (e.g., fuel is not supplied to the engine), as labeled. For plot 608, the vertical axis shows the status of the ISG as "off," "motor," or "generator," as labeled.

Prior to time t1, the vehicle is keyed off. As such, the vehicle and the engine are both at rest, each having a speed of zero (plots 602 and 604, respectively). Because the engine is off, fuel is not provided to the engine (plot 606). The ISG is also off (e.g., in a neutral mode), not being operated as either a motor or a generator (plot 608). The battery SOC is relatively constant (plot 610), as there are no appreciable electrical loads on the battery. Further, the battery SOC is greater than a first, lower threshold SOC (dashed line 612) that corresponds to a SOC below which the battery may be unable to start the engine and/or execute additional vehicle functions upon starting. As such, the battery SOC is high enough to enable engine cranking. The battery SOC is also less than a second, upper threshold SOC (dashed line 614) that responds to the battery being fully charged.

At time t1, the vehicle is keyed on. An engine start is requested responsive to the key-on event. As a result, the ISG is operated as a motor (plot 608), drawing electrical power from the system battery to create positive torque on the engine crankshaft and quickly increase the engine speed. As such, the battery SOC decreases (plot 610) while the ISG is operated as a motor. In particular, the electrical power causes a shaft of the ISG to rotate, and torque from the ISG shaft is transferred to a first belt drive via a first decoupler that is engaged with and rotationally coupled to the shaft via a first clutch spring. The first belt drive in turn transfers the torque from the ISG to the engine crankshaft in a first torque transfer direction. In contrast, a second decoupler disengages with the ISG shaft via a second clutch spring and freely rotates without transferring torque between the ISG shaft and a second belt drive, although tension is maintained in the second belt drive by a corresponding tensioner. In this way, the first belt drive transfers torque between the ISG and the engine in the first torque transfer direction, and the second belt drive does not.

At time t2, fuel is provided to the engine (plot 606) to commence combustion. As such, the ISG is no longer operated as a motor, and power is no longer supplied to the ISG. Further, the battery SOC (plot 610) remains above a third SOC threshold (dashed line 616) for operating in a regeneration mode in the absence of regenerative braking. As a result, the ISG deactivated and not operated as a motor or as a generator (plot 608). Thus, torque is not supplied from the ISG to the engine in the first torque transfer direction, and the first decoupler disengages from the ISG shaft via the first clutch spring. Further, between time t2 and time t3, the vehicle speed (plot 602) increases from rest, such as based on driver demand. In the example of FIG. 6, the engine speed (plot 604) is increased from an idle speed in order to meet the driver demand. However, it may be understood that the engine speed may not be directly proportional to vehicle speed due to operation of a transmission (e.g., transmission 208 of FIG. 2), which may result in differing transmission gear ratios and torque converter slippage amounts.

At time t3, a decrease in vehicle speed is requested by the driver, such as via application of a brake pedal. In response to the battery SOC (plot 610) being less than the second, upper threshold SOC (dashed line 614) while braking is requested, the ISG is operated as a generator (plot 608) for regenerative braking. That is, the second decoupler engages the ISG shaft as the engine speed decreases (plot 604) via the second clutch spring, thereby transferring torque from the engine crankshaft to the ISG shaft via the second belt drive in a second torque transfer direction. The torque from the engine rotates the ISG shaft, generating electric current that is stored at the battery. As a result, the battery SOC increases (plot 610) while the negative torque from the ISG decreases the engine speed (plot 604) and the vehicle speed (plot 602). Further, the first decoupler disengages with the ISG shaft via the first clutch spring and freely rotates without transferring torque between the ISG shaft and the first belt drive, although tension is maintained in the first belt drive by a corresponding tensioner. In this way, the second belt drive transfers torque the engine and the ISG in the second torque transfer direction, and the first belt drive does not.

At time t4, the vehicle comes to a stop, with a vehicle speed of zero (plot 602). In response, the engine is shut down for an auto-stop. Fueling is discontinued in the engine (plot 606), and the engine is spun down to rest (plot 604). Further, with the engine off, the ISG is deactivated (plot 608). However, it may be understood that the vehicle remains keyed-on during the auto-stop. Auxiliary systems of the vehicle, such as light and entertainment systems, continue to consume electrical power. As a result, the battery SOC decreases during the auto-stop (plot 610). The battery SOC remains above the first, lower threshold SOC (dashed line 612), and thus, the engine is not restarted because of the battery SOC.

At time t5, an engine restart request is received, such as responsive to a driver torque request. The ISG is again operated as a motor to restart the engine (plot 608), consuming electrical power stored at the battery to create mechanical energy for cranking the engine. As described above, torque is transferred from the rotating ISG shaft and the engaged first decoupler to the first belt drive, which in turn transfers the torque to the engine crankshaft (e.g., supplying in the first torque transfer direction) to increase the engine speed (plot 604).

At time t6, fuel is supplied to the engine to initiate combustion (plot 606). Further, the battery SOC (plot 610) has decreased below the third threshold SOC (dashed line 616). In response, even though vehicle braking is not requested, the ISG is directly transitioned from operating as a motor to operating as a generator (e.g., receiving torque in the second torque transfer direction) at time t6 (plot 608). As such, torque is transferred from the engine crankshaft to the second belt drive, which in turn transfers torque to the ISG shaft via the engaged second decoupler in the second torque transfer direction, and the battery SOC (plot 610) increases as the vehicle is driven. Responsive to the battery SOC (plot 610) reaching the second threshold SOC (dashed line 614), ISG is deactivated (plot 608).

In this way, the ISG is able to both transmit torque to the engine during cranking and absorb torque from the engine during regenerating without stressing belt drive system components. By including two isolated belt drives designed to transmit torque in different directions via two opposing decouplers, tension may be maintained in each belt drive, reducing hubloads on belt drive system components as the ISG transitions from operating as a motor to a generator. As a result, belt drive system component degradation may be decreased. Further, a transition time between the ISG operating as a motor and operating as a generator may be decreased. Further still, because the two belt drives are independent, each belt drive may operate at a different pulley ratio. For example, a starting sheave (e.g., a first belt drive) may have a greater pulley ratio than a generating sheave (e.g., a second belt drive) to enable each sheave to be appropriately sized for an amount of torque to be transferred (e.g., from the ISG to a crankshaft of the engine for the starting sheave and from the crankshaft to the ISG for the generating sheave). As a result, an efficiency of the ISG may be increased while operating as a motor and while operating as a generator.

The technical effect of including two opposing decouplers on two separate belt sheaves of a belt drive system for an integrated starter/generator is that tension may be maintained in the two separate belt sheaves at all times, regardless of a direction of torque transfer between the integrated starter/generator and the belt drive system.

As one example, a system comprises: an integrated starter/generator (ISG) rotationally coupled to an engine crankshaft via a belt drive system, the belt drive system including a first decoupler configured to engage a shaft of the ISG in a first torque transfer direction and disengage in a second, opposite torque transfer direction and a second decoupler configured to engage the shaft of the ISG in the second torque transfer direction and disengage in the first torque transfer direction. In the preceding example, additionally or optionally, the first decoupler includes a first clutch spring and a first pulley, the first pulley shaped to engage with a first belt that rotationally couples the first pulley to the engine crankshaft, and the second decoupler includes a second clutch spring and a second pulley, the second pulley shaped to engage with a second belt that rotationally couples the second pulley to the engine crankshaft. In one or both of the preceding examples, additionally or optionally, the first decoupler and the second decoupler are positioned on a hub, the hub directly mounted on the shaft of the ISG and co-rotational about a common axis, and the system further comprises a first tensioner positioned to maintain tension in the first belt regardless of the torque transfer direction and a second tensioner positioned to maintain tension in the second belt regardless of the torque transfer direction. In any or all of the preceding examples, additionally or optionally, the first clutch spring operatively connects the first pulley to the ISG shaft via the hub in the first torque transfer direction only, and the second clutch spring operatively connects the second pulley to the ISG shaft via the hub in the second torque transfer direction only. In any or all of the preceding examples, additionally or optionally, radial expansion of the first clutch spring transmits torque between the first pulley and the hub in the first torque transfer direction only, and the first torque transfer direction includes the ISG shaft applying torque to the engine crankshaft via the first belt. In any or all of the preceding examples, additionally or optionally, the radial expansion of the first clutch spring is responsive to the hub rotating faster than the first pulley, and the first clutch spring contracts radially responsive to the first pulley rotating faster than the hub. In any or all of the preceding examples, additionally or optionally, radial expansion of the second clutch spring transmits torque between the second pulley and the hub in the second torque transfer direction only, and the second torque transfer direction includes the engine crankshaft applying torque to the ISG shaft via the second belt. In any or all of the preceding examples, additionally or optionally, the radial expansion of the second clutch spring is responsive to the second pulley rotating faster than the hub, and the second clutch spring contracts radially responsive to the hub rotating faster than the second pulley.

As another example, a method comprises: responsive to an engine start request, operating an integrated starter/generator (ISG) as a motor, including engaging a first sheave of a bidirectional decoupler with a shaft of the ISG while disengaging a second sheave of the bidirectional decoupler from the shaft, the first sheave coupled to a first belt and the second sheave coupled to a second belt, each of the first belt and the second belt rotationally coupling the bidirectional decoupler to a crankshaft of the engine; and responsive to a regeneration request, operating the ISG as a generator, including engaging the second sheave of the bidirectional decoupler with the shaft of the ISG while disengaging the first sheave from the shaft. In the preceding example, additionally or optionally, the bidirectional decoupler includes a hub directly mounted on the shaft of the ISG, the hub co-rotational with the shaft of the ISG about a common axis. In one or both of the preceding examples, additionally or optionally, a first clutch spring operatively connects the first sheave to the hub and a second clutch spring operatively disconnects the second sheave from the hub responsive to the shaft of the ISG rotating faster than the crankshaft. In any or all of the preceding examples, additionally or optionally, the second clutch spring operatively connects the second sheave to the hub and the first clutch spring operatively disconnects the first sheave from the hub responsive to the crankshaft rotating faster than the ISG. In any or all of the preceding examples, operating the ISG as the motor additionally or optionally further includes: supplying electrical power to the ISG to rotate the shaft of the ISG; and transferring torque from the shaft of the ISG to the crankshaft via the first sheave and the first belt and not the second sheave and the second belt. In any or all of the preceding examples, operating the ISG as the generator additionally or optionally further includes: rotating the crankshaft via combustion in cylinders of the engine; and transferring torque from the crankshaft to the shaft of the ISG via the second belt and the second sheave and not the first belt and the first sheave. In any or all of the preceding examples, additionally or optionally, the regeneration request is responsive to one or more of a request to decrease vehicle speed and a state of charge of a system battery being less than a threshold state of charge.

As another example, system for a vehicle powertrain comprises: an engine including a crankshaft; an electric machine rotationally coupled to the crankshaft via a first belt drive system and a second belt drive system, the first belt drive system configured to transfer torque from the electric machine to the crankshaft only and the second belt drive system configured to transfer torque from the crankshaft to the electric machine only; and a controller storing instructions in non-transitory memory that, when executed, cause the controller to: operate the electric machine to transfer torque to the engine via the first belt drive system responsive to an engine start request; and operate the electric machine to receive torque from the engine via the second belt drive responsive to a regeneration condition. In the preceding example, additionally or optionally, the first belt drive system includes a first decoupler pulley rotationally coupled to the crankshaft via a first belt, the first decoupler pulley rotationally coupled to a shaft of the electric machine when torque is transferred from the electric machine to the crankshaft and rotationally decoupled from the shaft of the electric machine when torque is transferred from the crankshaft to the electric machine. In any or all of the preceding examples, additionally or optionally, the first decoupler pulley includes a clutch spring that rotationally couples the first decoupler pulley to the shaft of the electric machine when torque is transferred from the electric machine to the crankshaft and rotationally decouples the first decoupler pulley from the shaft of the electric machine when torque is transferred from the crankshaft to the electric machine. In any or all of the preceding examples, additionally or optionally, the second belt drive system includes a second decoupler pulley rotationally coupled to the crankshaft via a second belt, the second decoupler pulley rotationally coupled to the shaft of the electric machine when torque is transferred from the crankshaft to the electric machine and rotationally decoupled from the shaft of the electric machine when torque is transferred from the electric machine to the crankshaft. In any or all of the preceding examples, additionally or optionally, the second decoupler pulley includes a clutch spring that rotationally couples the second decoupler pulley to the shaft of the electric machine when torque is transferred from the crankshaft to the electric machine and rotationally decouples the second decoupler pulley from the shaft of the electric machine when torque is transferred from the electric machine to the crankshaft.

In another representation, a system comprises: an integrated starter/generator (ISG) rotationally coupled to an engine crankshaft via a first clutch spring in a first torque direction only and via a second clutch spring in a second torque direction only, the second torque direction opposite the first torque direction, the first clutch spring and the second clutch spring both included in a bidirectional decoupler. In the preceding example, additionally or optionally, the first clutch spring engages a shaft of the ISG with a first pulley in the first torque direction only, and the second clutch spring engages the shaft of the ISG with a second pulley in the second torque transfer direction only. In one or both of the preceding examples, additionally or optionally, the first pulley is rotationally coupled to the engine crankshaft via a first belt and the second pulley is rotationally coupled to the engine crankshaft via a second belt. In any or all of the preceding examples, additionally or optionally, the first torque direction is from the shaft of the ISG to the engine crankshaft, and the second torque direction is from the engine crankshaft to the ISG. In any or all of the preceding examples, additionally or optionally, the first pulley overruns in the second torque direction and the second pulley overruns in the first torque direction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an integrated starter/generator (ISG) rotationally coupled to an engine crankshaft via a belt drive system, the belt drive system including a first decoupler configured to engage a shaft of the ISG in a first torque transfer direction and disengage in a second, opposite torque transfer direction and a second decoupler configured to engage the shaft of the ISG in the second torque transfer direction and disengage in the first torque transfer direction.

2. The system of claim 1, wherein the first decoupler includes a first clutch spring and a first pulley, the first pulley shaped to engage with a first belt that rotationally couples the first pulley to the engine crankshaft, and the second decoupler includes a second clutch spring and a second pulley, the second pulley shaped to engage with a second belt that rotationally couples the second pulley to the engine crankshaft.

3. The system of claim 2, wherein the first decoupler and the second decoupler are positioned on a hub, the hub directly mounted on the shaft of the ISG and co-rotational about a common axis, and the system further comprises a first tensioner positioned to maintain tension in the first belt regardless of the torque transfer direction and a second tensioner positioned to maintain tension in the second belt regardless of the torque transfer direction.

4. The system of claim 3, wherein the first clutch spring operatively connects the first pulley to the ISG shaft via the hub in the first torque transfer direction only, and the second clutch spring operatively connects the second pulley to the ISG shaft via the hub in the second torque transfer direction only.

5. The system of claim 3, wherein radial expansion of the first clutch spring transmits torque between the first pulley and the hub in the first torque transfer direction only, and the first torque transfer direction includes the ISG shaft applying torque to the engine crankshaft via the first belt.

6. The system of claim 5, wherein the radial expansion of the first clutch spring is responsive to the hub rotating faster than the first pulley, and the first clutch spring contracts radially responsive to the first pulley rotating faster than the hub.

7. The system of claim 3, wherein radial expansion of the second clutch spring transmits torque between the second pulley and the hub in the second torque transfer direction only, and the second torque transfer direction includes the engine crankshaft applying torque to the ISG shaft via the second belt.

8. The system of claim 7, wherein the radial expansion of the second clutch spring is responsive to the second pulley rotating faster than the hub, and the second clutch spring contracts radially responsive to the hub rotating faster than the second pulley.

9. A method, comprising:
responsive to an engine start request, operating an integrated starter/generator (ISG) as a motor, including engaging a first sheave of a bidirectional decoupler with a shaft of the ISG while disengaging a second sheave of the bidirectional decoupler from the shaft, the first sheave coupled to a first belt and the second sheave coupled to a second belt, each of the first belt and the second belt rotationally coupling the bidirectional decoupler to a crankshaft of the engine; and
responsive to a regeneration request, operating the ISG as a generator, including engaging the second sheave of the bidirectional decoupler with the shaft of the ISG while disengaging the first sheave from the shaft.

10. The method of claim 9, wherein the bidirectional decoupler includes a hub directly mounted on the shaft of the ISG, the hub co-rotational with the shaft of the ISG about a common axis.

11. The method of claim 10, wherein a first clutch spring operatively connects the first sheave to the hub and a second clutch spring operatively disconnects the second sheave from the hub responsive to the shaft of the ISG rotating faster than the crankshaft.

12. The method of claim 11, wherein the second clutch spring operatively connects the second sheave to the hub and the first clutch spring operatively disconnects the first sheave from the hub responsive to the crankshaft rotating faster than the ISG.

13. The method of claim 9, wherein operating the ISG as the motor further includes:
supplying electrical power to the ISG to rotate the shaft of the ISG; and
transferring torque from the shaft of the ISG to the crankshaft via the first sheave and the first belt and not the second sheave and the second belt.

14. The method of claim 9, wherein operating the ISG as the generator further includes:
rotating the crankshaft via combustion in cylinders of the engine; and
transferring torque from the crankshaft to the shaft of the ISG via the second belt and the second sheave and not the first belt and the first sheave.

15. The method of claim 9, wherein the regeneration request is responsive to one or more of a request to decrease vehicle speed and a state of charge of a system battery being less than a threshold state of charge.

16. A system for a vehicle powertrain, comprising:
an engine including a crankshaft;
an electric machine rotationally coupled to the crankshaft via a first belt drive system and a second belt drive system, the first belt drive system configured to transfer torque from the electric machine to the crankshaft only and the second belt drive system configured to transfer torque from the crankshaft to the electric machine only; and a controller storing instructions in non-transitory memory that, when executed, cause the controller to:
  operate the electric machine to transfer torque to the engine via the first belt drive system responsive to an engine start request; and
  operate the electric machine to receive torque from the engine via the second belt drive responsive to a regeneration condition.

17. The system of claim 16, wherein the first belt drive system includes a first decoupler pulley rotationally coupled to the crankshaft via a first belt, the first decoupler pulley rotationally coupled to a shaft of the electric machine when torque is transferred from the electric machine to the crankshaft and rotationally decoupled from the shaft of the electric machine when torque is transferred from the crankshaft to the electric machine.

18. The system of claim 17, wherein the first decoupler pulley includes a clutch spring that rotationally couples the first decoupler pulley to the shaft of the electric machine when torque is transferred from the electric machine to the crankshaft and rotationally decouples the first decoupler pulley from the shaft of the electric machine when torque is transferred from the crankshaft to the electric machine.

19. The system of claim 17, wherein the second belt drive system includes a second decoupler pulley rotationally coupled to the crankshaft via a second belt, the second decoupler pulley rotationally coupled to the shaft of the electric machine when torque is transferred from the crankshaft to the electric machine and rotationally decoupled from the shaft of the electric machine when torque is transferred from the electric machine to the crankshaft.

20. The system of claim 19, wherein the second decoupler pulley includes a clutch spring that rotationally couples the second decoupler pulley to the shaft of the electric machine when torque is transferred from the crankshaft to the electric machine and rotationally decouples the second decoupler pulley from the shaft of the electric machine when torque is transferred from the electric machine to the crankshaft.

* * * * *